United States Patent [19]

Legendre

[11] Patent Number: 4,461,550
[45] Date of Patent: Jul. 24, 1984

[54] PROGRESSIVE OPHTHALMIC LENS

[75] Inventor: Serge Legendre, Creteil, France

[73] Assignee: Essilor International Cie Generale d'Optique, Echat, France

[21] Appl. No.: 256,291

[22] Filed: Apr. 22, 1981

[30] Foreign Application Priority Data

Apr. 30, 1980 [FR] France .................. 80 09757

[51] Int. Cl.³ .............................................. G02C 7/06
[52] U.S. Cl. .................................................. 351/169
[58] Field of Search ................................ 351/169, 177

[56] References Cited

U.S. PATENT DOCUMENTS

| | | | |
|---|---|---|---|
| 2,405,989 | 8/1946 | Beach | 351/169 |
| 3,010,366 | 11/1961 | Crawford | 351/169 |
| 3,542,535 | 11/1970 | Hensler et al. | 351/169 X |
| 3,563,057 | 2/1971 | Rosenbauer | 351/169 X |
| 3,610,924 | 10/1971 | Sinai | 351/169 X |
| 3,877,798 | 4/1975 | Tolar et al. | 351/176 X |
| 3,904,281 | 9/1975 | Jampolsky | 351/159 |

FOREIGN PATENT DOCUMENTS

| | | | |
|---|---|---|---|
| 1411976 | 8/1965 | France . | |
| 2393335 | 2/1979 | France | 351/169 |
| 10742 | 1/1977 | Japan | 351/176 |
| 1163002 | 9/1969 | United Kingdom | 351/169 |

Primary Examiner—John K. Corbin
Assistant Examiner—Scott J. Sugarman
Attorney, Agent, or Firm—Charles E. Brown

[57] ABSTRACT

A progressive opthalmic lens is disclosed which has an upper part of constant refractive power for distance vision and a lower part of progressively variable refractive power for near vision. In order to increase the effective field of intermediate vision while providing smooth transition between the upper and lower parts of the lens for the user, an additional segment providing a local addition of refractive power is superposed on at least a portion of the progressive variable power zone of the lens. The additional segment may comprise an insert or a protuberance on the progressive portion which may be formed as a surface film on a blank base or substrate. The additional segment may have constant refractive power or include a progressively variable refractive power area.

5 Claims, 13 Drawing Figures

PROGRESSIVE OPHTHALMIC LENS

BACKGROUND OF THE INVENTION

The present invention relates generally to ophthalmic lenses suited for both distance vision and near vision, namely for correcting farsightedness.

As is well known there are two general categories of ophthalmic lenses which fulfill this requirement. First of all, there are bifocal ophthalmic lenses which have a first constant refractive power zone forming the major part of the lens and adapted for distance vision on which is locally superposed in the lower part of the lens, forming a segment, a second constant refractive power zone for near vision. Such bifocal ophthalmic lenses which are well adapted to users leading a sedentary existence not requiring frequent switching from near vision to distance vision and vice versa have the advantage of providing extensive distance vision and near viewing areas. For static vision they provide very good visual comfort.

But such bifocal lenses have the drawback of a boundary at the upper limit of the second constant refractive power zone separating the first and second constant refractive power zones which results in a power discontinuity for most such bifocal lenses when passing from the near viewing zone to the distance vision zone and vice versa, causing an annoying "jump" which is all the greater with large power differences.

The second type of ophthalmic lens which is well suited to both distance vision and near vision is the so-called progressive ophthalmic lens, i.e., an ophthalmic lens comprising a zone of progressively variable refractive power along at least one of its meridians.

In practice, the progressively variable refractive power zone covers generally the lower part of the lens for near vision whereas the upper part of the lens defines a constant refractive power zone adapted to distance vision. The progressive refractive power zone is continuously connected to the constant refractive power zone and progressively adds additional power thereto whose value measured along the principal meridian between the upper boundary of the progressively variable refractive power zone and the effective lower boundary thereof corresponds to the additional near correction necessary referred to as the addition.

Such progressive ophthalmic lenses advantageously provide a continuous power transition without any discontinuity or jump between the near viewing zone and the distance viewing zone. They therefore offer excellent dynamic viewing comfort and therefore are particularly suitable for persons whose activity requires frequent changes from distance viewing to near viewing and vice versa.

But such progressive ophthalmic lenses have various drawbacks, namely they provide, for intermediate viewing between distance and near viewing only a relatively narrow field of correct vision to either side of the principal meridian, the field of correct vision being flanked by lateral zones with greater or lesser aberrations which bothers viewing and is all the more annoying with greater power additions of the progressively variable refractive power zone.

OBJECT AND SUMMARY OF THE INVENTION

An object of the present invention is to provide a progressive ophthalmic lens in which the aforesaid drawbacks are advantageously minimized.

According to the invention there is provided a progressive ophthalmic lens of the type comprising a progressively variable refractive power zone along at least one of its meridians, characterized by an optically superposed segment on at least a portion of the progressively variable refractive power zone providing a local power addition.

According to a possible embodiment the additional segment and the progressively variable refractive power zone are part of the same blank which defines the actual lens.

For example, when the material constituting the additional segment which is different from that of the rest of the lens the segment is fused into the latter. Alternatively, when the additional segment is made of the same material as the lens it forms a protuberance on the surface thereof.

According to another embodiment the additional segment comprises part of a base blank and the progressively variable power zone comprises a superposed surface film, the combination of the base lens blank and the film defining the actual ophthalmic lens.

In any event with the progressive ophthalmic lens according zone to the invention the total additional power required for the transition from the distance viewing to near viewing is advantageously distributed between a progressively variable refractive power zone and an additional segment superposed thereon. Since there is a progressively variable refractive power zone the added power due to the zone is relatively small and therefore the lateral zones flanking it only have attenuated aberrations, whereby the field of correct vision is thus enlarged and user comfort enhanced.

Also, since an additional segment is employed, the discontinuity of power between the upper boundary is relatively moderate, and therefore the jump due to this power discontinuity in the course of transition from distance viewing to near viewing or vice versa is relatively smooth and therefore in practice not annoying for the user.

Thus, the progressive ophthalmic lens according to the invention affords very good visual comfort for both static and dynamic vision. It therefore comprises an advantageous compromise between conventional progressive ophthalmic lenses and bifocal lenses, by combining the advantages of each type and minimizing their respective drawbacks.

Furthermore it also has the advantage of enabling easy manufacture according to conventional methods of fabrication of progressive ophthalmic lenses and bifocal lenses.

The features and advantages of the progressive ophthalmic lens according to the invention will be further brought out in the description which follows, given by way of example, with reference to the accompanying schematic drawings.

DETAILED DESCRIPTION OF THE PREFERRED EMBODIMENT

Figure 1:
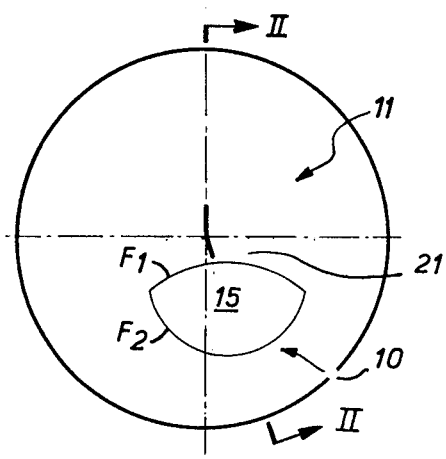
FIG. 1 shows an elevational view of a progressive ophthalmic lens in accordance with a first embodiment of the invention.
Figure 2:
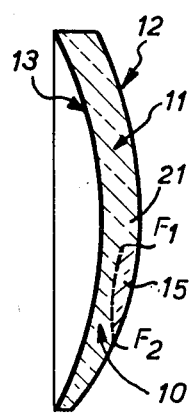
FIG. 2 shows a sectional view taken along broken line II—II in FIG. 1.

In FIGS. 1 and 2 the progressive ophthalmic lens is shown before edging, i.e., before the trimming of the lens blank to adapt it to the contour of the rim of the eyeglass frame in which it is to be mounted, the edge of the lens being substantially circular at this stage. This lens is progressive in that it comprises a progressively variable refractive power zone 10 along at least one of its meridians which constitutes its principal meridian which is, for example, the one marked by the section line for FIG. 2.

In the illustrated embodiment of FIG. 1, the progressively variable refractive power zone or area 10 generally comprises the lower part of the lens whereas the upper part of the lens comprises a constant refractive power zone 11. The two zones are joined to each other continuously along substantially the median horizontal plane of the lens.

In practice the front or outer face 12 of the lens which is convex therefore comprises a spherical upper portion and a lower portion whose radius of curvature along the principal meridian varies, for example, first it decreases progressively downwards then remains constant, as shown. The rear or inner face 13 of the lens which is concave may be as desired, for example, it may be spherical, toric or cylindrical. Methods of producing such forward and rear faces 12 and 13 are well known per se and as they do not in themselves constitute part of the invention they will not be described in greater detail.

According to the invention an additional segment 15 is optically superposed over at least part of the progressively variable refractive power zone 10, the additional segment locally increasing the power.

In the illustrated embodiment of FIGS. 1 and 2, which is particularly suited for mineral glass lenses, the additional segment 15 is of a material different from the rest of the lens and is fused into the body of the progressively variable refractive power zone 10 in accordance with a known technique which is that of bifocal lenses and will be described hereinbelow with reference to FIGS. 5A, 5B, 5C and 5D.

Starting with a lens blank 16 (see FIG. 5A) for the sought progressively variable ophthalmic lens, a depression 17 is hollowed out in the convex face 12 of the lens blank. The depression 17 may, for example, be spherical, toric or any other configuration. A fusible disclike insert 20 is inserted into the depression, the insert being adapted to form the sought additional segment 15. The insert 20 is in part made of the same material as the lens blank 16 and in part of a different material but which is adapted to fuse with the latter (see FIG. 5B).

Figure 5A:
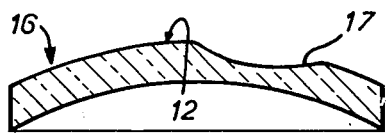
FIGS. 5A, 5B, 5C, 5D are sectional views illustrating various stages of fabrication of the progressive ophthalmic lens illustrated in FIG. 1.
Figure 5B:
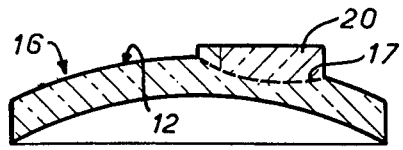
Figure 5C:
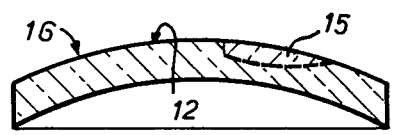
Figure 5D:
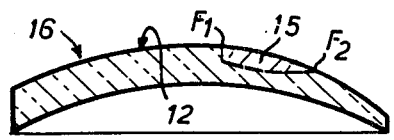

Then the assembly of the blank with the insert is heated to a temperature sufficient to insure bonding by fusion along the common junction surface defined by the depression 17. Then insert 20 is shaped to the level of the convex face 12 of the lens blank 16 as shown in FIG. 5C. Finally, the convex face of the lens is ground to its ultimate sought-after part spherical progressive contour as shown in FIG. 5D.

The additional segment 15 at the surface of the progressively variable refractive power zone 10 has a predetermined refractive power itself. Even though the outer surface of the segment 15 on the convex face 12 of the lens is in continuity with that of the progressively variable refractive power zone 10 and results from combined machining therewith, the power of the segment 15 may for example be constant or substantially constant, which is the case with the embodiment of FIGS. 1–3. Indeed, the known machining techniques for obtaining a progressive surface permit the adjustment, at will, of the resulting power variations and it is therefore possible to make the variations for the additional segment 15 substantially zero or zero, or sufficiently small in any event so as not to be noticeable (less than 0.12 diopter for the height of additional segment 15). In other words in this embodiment an intermediate zone 21 of progressively variable refractive power extends between the constant refractive power zone 11 and the additional segment 15. This intermediate zone 21 advantageously comprises a transition zone between the distance viewing zone comprised by the constant refractive power zone 11 and the near viewing zone comprised by the additional segment 15.

Further, in the illustrated embodiment the segment is slightly offset with respect to the vertical meridian of the lens to take into account as is known per se the convergence of the eyes of the wearer relative to each other when switching his gaze from distance viewing to near viewing. Accordingly, in the embodiment of FIG. 1 the lens corresponds to such correction for the right eye.

Figure 3:
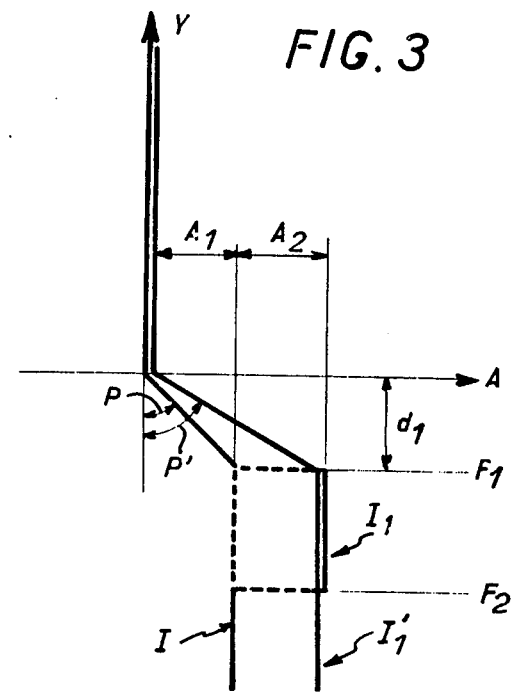
FIG. 3 shows a graph illustrating the power addition of the progressive ophthalmic lens along the principal meridian together with the addition of two prior art progressive lenses.

In the graph of FIG. 3, as is usual, on the abscissa is the additional refractive power A of the lower part of the lens with respect to the constant power of the upper part of the lens, taking into account the above-described construction of the lens, and on the ordinate axis is the meridian concerned, here the principal meridian, of the lens, i.e., the line along which the section of FIG. 2 is taken.

Absent additional segment 15 the curve of the addition due to the progressively variable power zone 10 itself is designated by reference character I and shown partly in solid lines and partly in dashed lines. In the illustrated example first there is an inclined straight line having a slope P relative to the vertical, assuming the addition varies linearly, then a straight line parallel to the vertical. The addition due to the additional segment 15 is therefore superposed on the progressively variable refractive power zone 10 and added thereto, the resultant lens therefore has the representative curve $I_1$. At the upper boundary F1 between the progressively variable refractive power zone 10 and the segment 15 there is a power discontinuity, the addition A2 due to the segment 15 abruptly adding to the addition A1 due to the progressively variable refractive power zone 10 forming the intermediate zone 21. Since the additional segment 15 has a constant or substantially constant power zone between the upper boundary F1 and its lower boundary F2 in the illustrated embodiment, the corresponding part of the representative curve of the addition is a straight vertical line.

In practice the effective part of the lens does not extend beyond the lower boundary F2 of the additional segment 15, in view of the edging required for accommodating it in the rims of a particular pair of glasses. Therefore if only the addition A is taken into consideration, between the constant refractive power zone 11 and the lower boundary F2 of the segment 15, the addition is divided, in accordance with the invention, between the addition A1 due to the progressively variable refractive power zone 10 and the addition A2 due to the additional segment 15.

In the illustrated embodiment and as shown in solid lines in the graph of FIG. 3, the division is substantially half and half, the addition A1 being substantially equal to addition A2. But this is not necessarily so. On the contrary, as an alternative, the addition due to additional segment 15 may have a value A'2 less than the value of the addition A1 due to progressively variable refractive power zone 10, or a value A'2 greater than that the latter; in either case the addition A'1 (or A'1) of the progressive part is such that the sum of the addition [A'1 (or A''1)+A'2 (or A''2)] is equal to the sum of previous addition [A1+A2] (not shown in the drawings).

In any event, as will be noted, to obtain the addition A for only the progressively variable refractive power zone 10 at a point of the lens corresponding to the boundary F1 with the additional segment, this zone must have a steeper progressiveness, such as shown by the sloping straight line I'$_1$ of the graph of FIG. 3, whose slope P' with respect to the vertical is greater than that of the slope P of the sloping straight line of the preceding curve I$_1$. The aberrations in the lower lateral zones of the lens are thus more pronounced and therefore the correct viewing zone is thus reduced.

Figure 4:
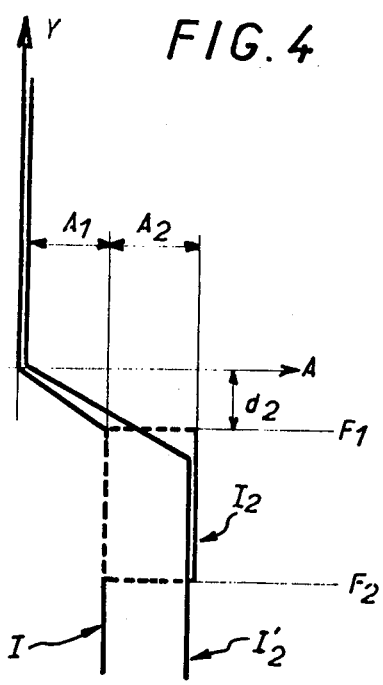
FIG. 4 shows a graph similar to that of FIG. 3, for an alternative embodiment of the invention, together with additions of conventional progressive lenses.

Above, it has been assumed that the height d1 of the progressively variable refractive power intermediate zone was constant throughout. Alternatively, as shown in FIG. 4, the height d2 of this zone in the presence of the additional zone 15 (curve I$_2$) is less than it would be for the same total addition in the absence of such an additional segment (curve I'$_2$). As the reader will have understood the curves I, on the one hand, and I'$_1$ and I'$_2$ on the other hand, correspond to conventional progressive ophthalmic lenses in contrast to curves I$_1$ and I$_2$ which correspond to ophthalmic lenses according to the invention.

Figure 6:
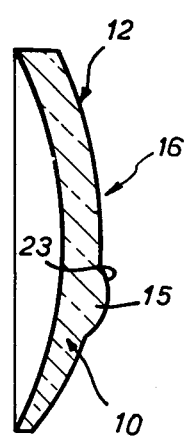
FIG. 6 shows a sectional view similar to that of FIG. 2 for an alternative embodiment.
Figure 7:
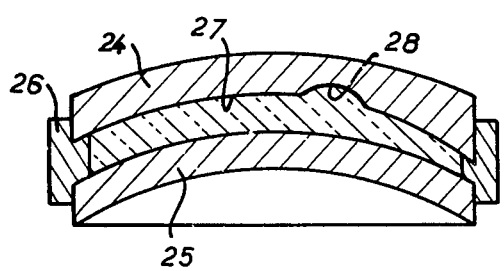
FIG. 7 shows a sectional view illustrating a contemplated method of fabrication for the alternative embodiment of FIG. 6.

According to an alternative embodiment illustrated in FIG. 6, the additional segment comprises a protuberance, for example, with a spherical surface 23. In practice this additional segment 15 protrudes from the convex side of the lens which is the one on which the progressively variable refractive power zone is formed. However, as a variant, it may also protrude from the other side of the lens and/or the progressively variable refractive power zone may be formed thereon.

In any event such an embodiment is particularly suited to ophthalmic lenses made of organic material. As is known, such organic material lenses are molded from such material between a concave mold part 24 and a convex mold part 21 with an annular gasket 26 interposed at the peripheries therebetween. A negative replica of the progressively variable curve for the lens is machined into the concave surface 27 of the mold part 24. Also a negative replica of the protuberance, i.e., a recess or depression 28 for the sought after additional segment 15, is machined therein. As above, the additional segment 15 provides local power addition.

Figure 8:
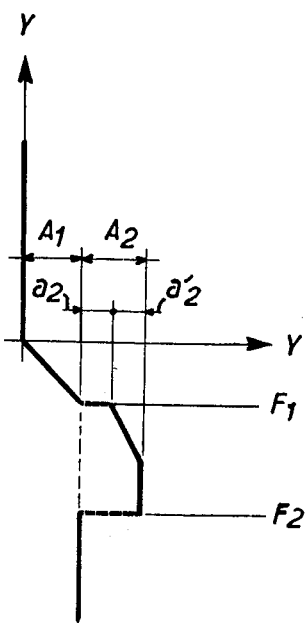
FIGS. 8 and 9 show graphs similar to those of FIGS. 3 and 4 relative to alternative embodiments of the invention.
Figure 9:
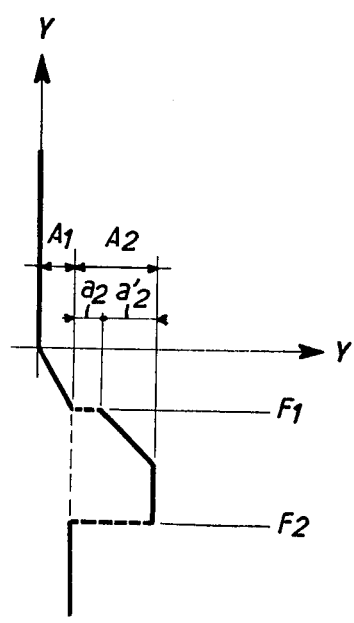

In the foregoing it has been assumed that in line with the segment 15 the lens generally has a constant or substantially constant focal power throughout. Alternatively, as illustrated in the graphs of FIGS. 8 and 9, the focal power is constant or substantially constant for only a portion of the additional segment 15. For example, as shown, the overall addition A2 results in part from an abrupt power addition a2 at its boundary F1 and a progressive power addition a'2, the additional segment thus has a variable radius of curvature in its upper part. Additions a2 and a'2 may be equal as shown in FIG. 8 or different as shown in FIG. 9.

In the foregoing embodiments it has been assumed that the additional segment 15 and the progressively variable refractive power zone 10 are part of the same lens blank which itself comprises the ultimate lens.

Figure 10:
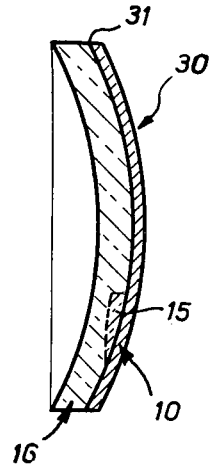
FIG. 10 shows a sectional view similar to that of FIG. 2 relative to yet another alternative embodiment.

According to the embodiment illustrated in FIG. 10, the additional segment 15 comprises part of the lens blank 16 which comprises a blank base or substrate and the progressively variable refractive power zone 10 is formed by a surface film 30 superposed on the blank base or substrate. Of course, as above, the additional segment is preferable fused into the blank base or substrate. Likewise, the surface film 30 which is preferably made of glass having the same index of refraction as that of the glass which forms the main part of the lens blank may be fused therewith. Alternatively, they may be simply glued together. In any event, the surface 31 or the lens blank on which the film 30 is superposed and the corresponding concave surface of the film 30 are both preferably spherical. In conjunction therewith the convex side of the surface film 30 is such that its configuration is shaped to obtain the desired progressively variable refractive power zone 10.

Thus the parts of lenses in which the additional segment is used and the parts in which the progressively variable refractive power zone are advantageously dissociated from each other, each of these parts requiring specific manufacturing techniques which have been fully mastered.

The thickness of the surface film 30 is as desired. For example, it may be a mere fraction of the blank substrate or base as shown.

The invention is not intended to be limited to the illustrated and disclosed embodiments but on the contrary admits of variations, modifications and alternatives without departing from the scope of the invention defined by appended claims.

What is claimed is:

1. An ophthalmic lens comprising a substantially constant power zone, a variable power zone having a variable radius of curvature along at least one meridian of said lens, and an additional segment optically superposed on a portion of said variable power zone thereby providing a local addition of refractive power, said variable power zone comprising a transition zone of progressively variable power extending between said substantially constant power zone and said additional segment so as to form a reduced power discontinuity at the border between said transition zone and said additional segment.

2. A lens according to claim 1, wherein said variable power zone generally forms the lower part of the lens and the substantially constant power zone comprises generally the upper part of the lens.

3. A lens according to claim 1, wherein said additional segment comprises part of a blank substrate or base and the variable power zone comprises part of a surface film superposed on said blank substrate or base.

4. A lens according to claim 3, wherein the surface of said blank substrate or base on which said film is superposed is spherical.

5. An ophthalmic lens comprising a substantially constant power zone, a variable power zone having a variable radius of curvature along at least one meridian of said lens, and an additional segment optically superposed on a portion of said variable power zone thereby providing a local addition of substantially constant refractive power, said variable power zone comprising a transition zone of progressively variable power extending between said substantially constant power zone and said additional segment so as to form a reduced power discontinuity at the border between said transition zone and said additional segment.

* * * * *